Figure 1:
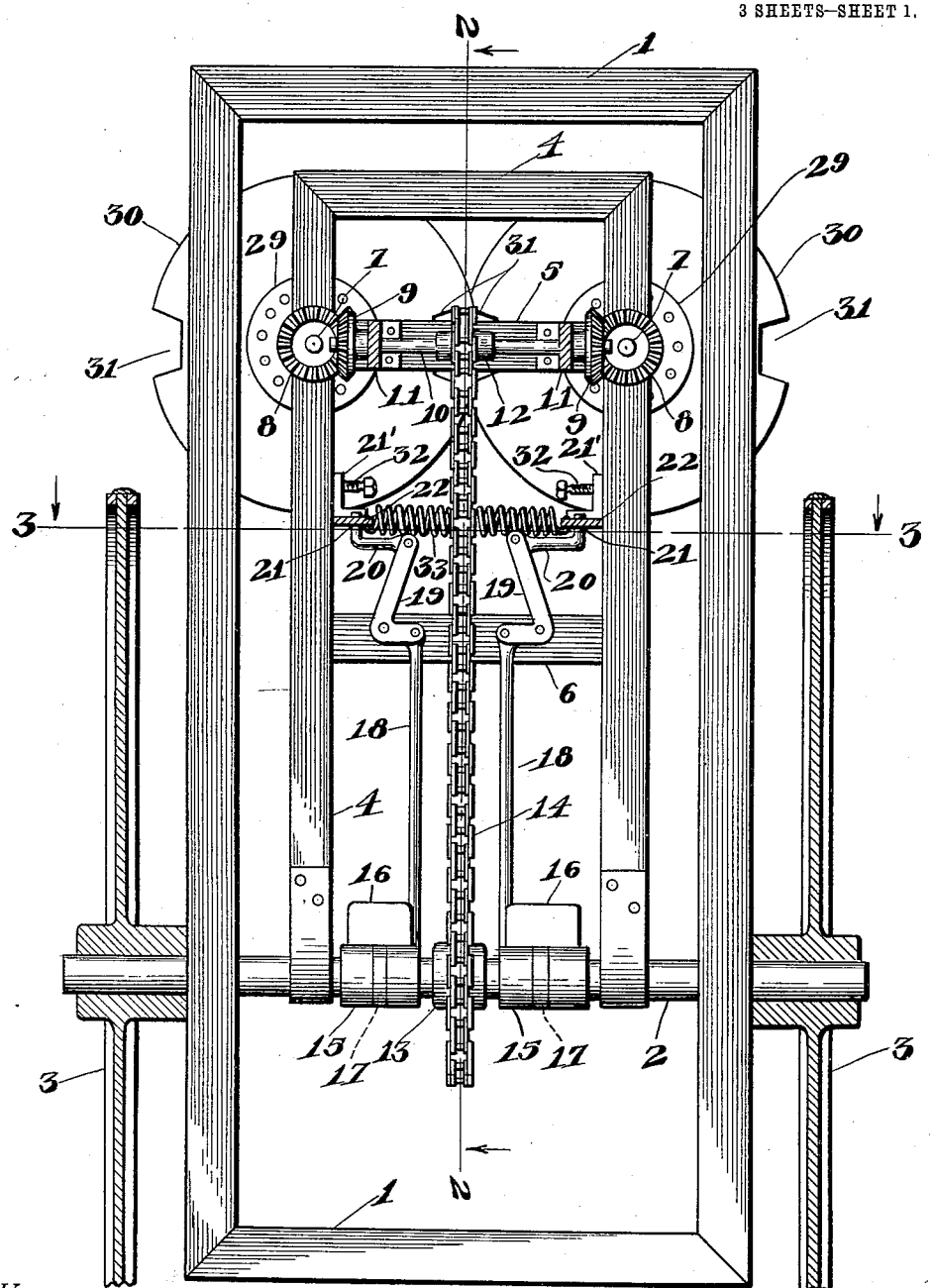

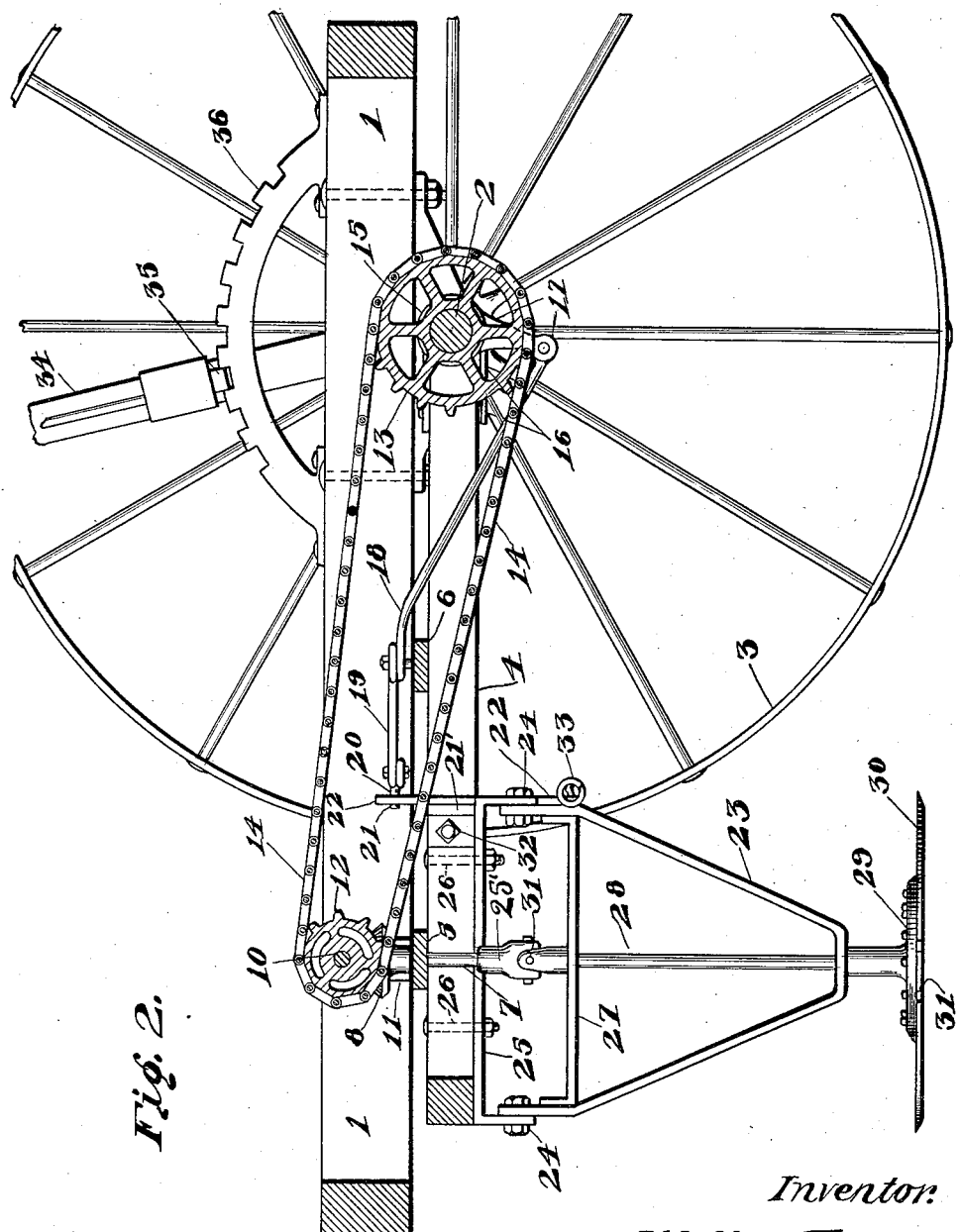

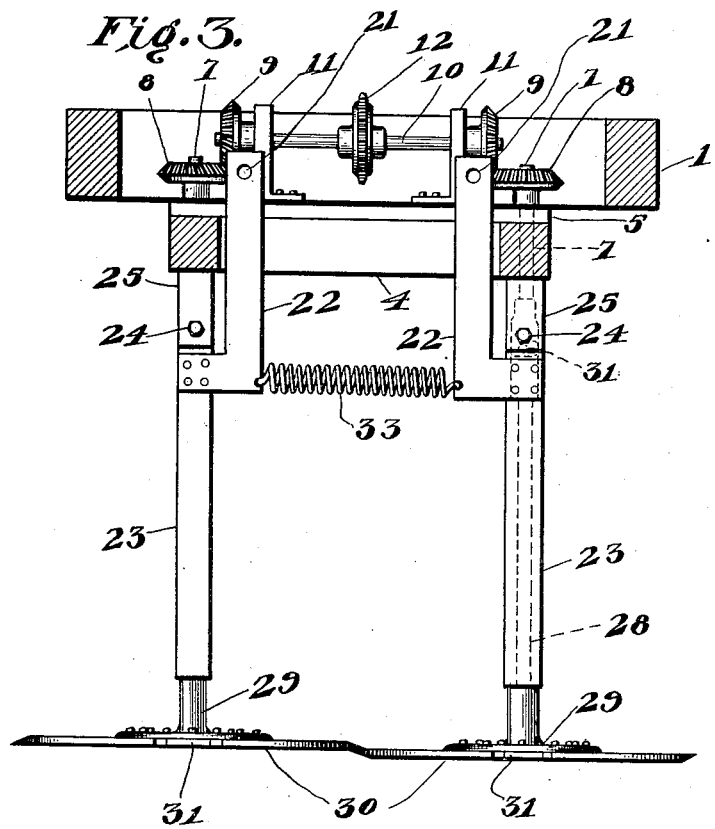

UNITED STATES PATENT OFFICE.

WALTER FREEMAN, OF ARDMORE, OKLAHOMA.

COTTON-THINNING MACHINE.

1,055,628. Specification of Letters Patent. Patented Mar. 11, 1913.

Application filed April 6, 1912. Serial No. 688,956.

*To all whom it may concern:*

Be it known that I, WALTER FREEMAN, a citizen of the United States, residing at Ardmore, in the county of Carter and State of Oklahoma, have invented certain new and useful Improvements in Cotton - Thinning Machines; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in cotton choppers or apparatus for thinning out cotton, etc., and comprises a simple and efficient apparatus of this nature having various details of construction and combinations and arrangements of parts, which will be hereinafter fully described, shown in the accompanying drawings, and then specifically defined in the appended claims.

I illustrate my invention in the accompanying drawings, in which:—

Figure 1 is a horizontal sectional view through the apparatus showing top plan of the operative parts of the invention. Fig. 2 is a longitudinal sectional view on line 2—2 of Fig. 1, showing parts in elevation, and Fig. 3 is a cross sectional view on line 3—3 of Fig. 1.

Reference now being had to the details of the drawings by numeral, 1 designates the main frame of the apparatus which is of general rectangular shape and has an axle 2 mounted in suitable bearings in the opposite sides of the frame and to which driving wheels 3 are fixed. A second or auxiliary frame, designated by numeral 4, is pivotally mounted at one end upon the axle 2 and its other end is free, said frame 4 being adapted to have a vertical adjustment through mechanism which will be presently described. Said frame 4 has cross-pieces 5 and 6, in the former of which vertically disposed rotatable stub shafts 7 are journaled, each of which is provided with a beveled gear 8 which are in mesh with similar bevel gear wheels 9 fixed to the shaft 10 which is journaled in the vertical portions 11 rising from the frame 4. A sprocket wheel 12 is fixed to the shaft 10 and a second sprocket wheel 13, shown in Fig. 2 of the drawings, is fixed to the axle 2 and a chain 14 passes about said sprocket wheels, the latter being of different diameters and so proportioned as to give the required amount of speed to the cutting apparatus.

Loosely mounted upon the axle are the collars 15 from each of which projects a foot treadle 16 and each collar is provided with a downwardly extending arm 17, shown in Fig. 2 of the drawings, and has pivoted thereto one end of the rod 18, the other end of which rod is pivotally connected to the short end of an angle lever 19. It will be noted upon reference to Fig. 1 of the drawings that there are two of said levers 19 pivoted upon the cross-piece 6 each of which has pivotal connection at the end of its long arm with an angle rod 20, each of which in turn is pivotally mounted in apertures 21 formed in the upper ends of the angle plates 22, which latter are shown in side elevation in Fig. 3 of the drawings and each have their short arms securely bolted or otherwise fastened to the oscillating frames 23, there being two of the latter each pivotally mounted upon bolts 24 which are mounted in the depending arms of the angle plate 25, the latter being held by means of bolts 26 to the frame 4. A horizontally disposed brace bar 27 is fastened to parallel portions of the oscillating frame and has a central aperture forming a bearing for the rotatable shaft 28, which latter carries a flanged collar 29 at its lower end to which a cutting disk 30 is bolted, while its upper end has a universal joint connection through the medium of the bolts 31 with a collar 25′ which is fastened to the rotatable shaft 7. It will be noted upon reference to Fig. 3 of the drawings that the portions of the cutting edges of the two disks overlap each other and, upon reference to Fig. 1, it will be seen that the circumferences of the disks have, at points diametrically opposite, recesses 31, provided to allow certain stalks or plants to remain uncut when two of the recesses come in registration where the disks overlap each other. While only two recesses are shown, it is obvious that any number may be formed in the disks, should it be desired to allow more stalks to remain uncut as the disks rotate while the apparatus is passing over the ground.

The frames 23 are mounted to have a lateral swinging adjustment which is made possible by reason of the pivotal points between the upper ends of the frames and the pivotal point connecting the shafts 28 and 7 being in alinement, said adjustment being made through the medium of the adjusting screws 32 which are mounted in threaded apertures in arms of the plates 21' and which are adapted to bear against the adjacent faces of the sides of the frame 4, a suitable spring 33 bearing between the angled ends of the plates 22 and serving to hold the two oscillating frames 23 at their farthest inner throw under different adjustments, thereby regulating the distance that the cutting blades overlap each other.

A vertical adjustment is given to the frame 4 which carries the cutting blades through the medium of the operating lever 34, shown in Fig. 2 of the drawings, and which is fixed to the shaft 2, a suitable pawl 35 being carried by the lever and adapted to engage the teeth of the segment 36.

The operation of my invention will be readily understood and is as follows:—The parts being adjusted as shown with the disks lapping each other a short distance, the same effect will be had in the operation of the disks as though they were rolling upon the ground at the point where they lap. By reason of the adjustable features, the disks may be mounted to rotate, overlapping at different distances and through the medium of the operating lever the disks may be raised or lowered as may be desired to conform to irregularities in the surface of the ground. By depressing the pedals, the oscillating frames may be moved toward or away from each other, being returned to their normal position by reason of the spring interposed between the angle plates. The disks rotating at a predetermined speed, dependent upon the relative diameters of the driving sprocket wheels, will serve to cut weeds and stalks over the course traversed by the apparatus, excepting certain stalks which happen to come opposite registering recesses in the circumferences of the disks, the distance between the stalks left standing depending entirely upon the number of recesses formed in the circumferences of the cutting edges of the disks.

What I claim to be new is:—

1. A cotton thinning apparatus comprising a frame, a driving axle mounted thereon, driving wheels fixed to the axle, an auxiliary frame pivotally mounted at one end upon said axle, means for adjusting the auxiliary frame vertically, oscillating frames mounted upon said auxiliary frame, means for adjusting the oscillating frames, a rotatable shaft journaled in suitable bearings upon the auxiliary frame, a shaft mounted in suitable bearings upon the oscillating frames and having universal joint connection with the shaft carried by the auxiliary frame, a cutting disk fixed to the shaft upon the oscillating frames adapted to overlap each other and having recesses in the circumference thereof, and means intermediate said shafts and axle for rotating the cutting disk, as set forth.

2. A cotton thinning apparatus comprising a frame, a driving axle mounted thereon, driving wheels fixed to the axle, an auxiliary frame pivotally mounted at one end upon said axle, means for adjusting the auxiliary frame vertically, oscillating frames mounted upon said auxiliary frame, means for adjusting the oscillating frames, a rotatable shaft journaled in suitable bearings upon the auxiliary frame, a shaft mounted in suitable bearings upon the oscillating frames and having universal joint connection with the shaft carried by the auxiliary frame, a cutting disk fixed to each shaft upon the oscillating frames adapted to overlap each other and having recesses in the circumference thereof, a lever fixed to the axle, a sprocket wheel upon the latter, a horizontally-disposed shaft journaled in suitable bearings upon the auxiliary frame and carrying a sprocket wheel, sprocket chain connections between said wheels, and gear connections between the horizontally-disposed shaft and the shaft which has universal joint connection with the disk-carrying shaft, as set forth.

3. A cotton thinning apparatus comprising a frame, a driving axle mounted thereon, driving wheels fixed to the axle, an auxiliary frame pivotally mounted at one end upon said axle, oscillating frames pivotally mounted upon the auxiliary frame, a rotatable disk upon each oscillating frame, means for driving the disks, movable tread members mounted upon the axle, and pivoted link connections between each tread member and an oscillating frame, as set forth.

4. A cotton thinning apparatus comprising a frame, a driving axle mounted thereon, driving wheels fixed to the axle, an auxiliary frame pivotally mounted one end upon said axle, oscillating frames pivotally mounted upon the auxiliary frame, a rotatable disk upon each oscillating frame, means for driving the disks, movable tread members mounted upon the axle, pivoted link connections between each tread member and an oscillating frame, and means for adjusting the oscillating frames, as set forth.

5. A cotton thinning apparatus comprising a frame, a driving axle mounted thereon, driving wheels fixed to the axle, an auxiliary frame pivotally mounted at one end upon said axle, oscillating frames pivotally mounted upon the auxiliary frame, a rotatable disk upon each oscillating frame, means for driving the disks, movable tread members mounted upon the axle, an arm projecting from each tread member, angle levers pivotally mounted upon the auxiliary frame, rod connections between said arms and angle levers, and angle rods pivotally connecting the angle levers and said oscillating frames, as set forth.

6. A cotton thinning apparatus comprising a frame, a driving axle mounted thereon, driving wheels fixed to the axle, an auxiliary frame pivotally mounted at one end upon said axle, oscillating frames pivotally mounted upon the auxiliary frame, a rotatable disk upon each oscillating frame, means for driving the disks, movable tread members mounted upon the axle, an arm projecting from each tread member, angle levers pivotally mounted upon the auxiliary frame, rod connections between said arms and angle levers, angle rods pivotally connecting the angle levers and said oscillating frames, and means for holding the oscillating frames in adjusted positions, as set forth.

7. A cotton thinning apparatus comprising a frame, a driving axle mounted thereon, driving wheels fixed to the axle, an auxiliary frame pivotally mounted at one end upon said axle, angle bars fixed to the auxiliary frame, oscillating frames pivotally connected to said angle bars, a rotatable shaft mounted in suitable bearings upon each oscillating frame, rotatable shafts carried by the auxiliary frame and having universal joint connections with the shafts upon the oscillating frames at points in alinement with the pivotal connections between the oscillating frames and said angle bars, means for adjusting the oscillating frames, and mechanism for rotating the disks, as set forth.

8. A cotton thinning apparatus comprising a frame, a driving axle mounted thereon, driving wheels fixed to the axle, an auxiliary frame pivotally mounted at one end upon said axle, angle bars fixed to the auxiliary frame, oscillating frames pivotally connected to said angle bar, a rotatable shaft mounted in suitable bearings upon each oscillating frame, rotatable shafts carried by the auxiliary frame and having universal joint connections with the shafts upon the oscillating frames and at points in alinement with the pivotal connections between the oscillating frames and said angle bars, angle plates fastened each to one of said oscillating frames, a spring intermediate said plates, angle rods pivotally connecting the angle plates with the auxiliary frame, and set screws carried by the plates and adapted to bear against the inner adjacent faces of opposite sides of the auxiliary frame, as set forth.

In testimony whereof I hereunto affix my signature in the presence of two witnesses.

WALTER FREEMAN.

Witnesses:
 L. W. MOSES,
 J. T. COLEMAN.